Patented Apr. 8, 1930

1,754,163

UNITED STATES PATENT OFFICE

FRITZ DRAISBACH, OF LUDWIGSHAFEN-ON-THE-RHINE, GERMANY, ASSIGNOR TO THE FIRM JOH. A. BENCKISER, CHEMISCHE FABRIK, OF LUDWIGSHAFEN-ON-THE-RHINE, GERMANY

PROCESS FOR STABILIZING BLEACHING LIQUORS

No Drawing. Application filed August 16, 1926, Serial No. 129,653, and in Germany January 14, 1926.

In all cases in which oxygen bleaching agents, such as perborate solutions, hydrogen peroxide solutions or sodium peroxide solutions are employed, it has for some time been considered essential in the interests of economy, to utilize the oxygen to as complete an extent as possible, that is to say to counteract the spontaneous decomposition of the oxygen compound.

Of the best known methods for this purpose mention may be made of Wolffenstein's method (French Patent 380,181) with di-sodium phosphate, the Gold & Silberscheideanstalt's method (German Patent 263,342) involving silicates and that of Sarason (U. S. Patent 1,000,298) with neutral pyrophosphate. All these inventions were based upon the idea that by adding the said salt to the bleaching liquor the dissociation of the oxygen salt should be considerably counteracted or retarded.

Of these three chief stabilizers, neutral pyrophosphate is the only one that has proved of any considerable importance in practice. This substance has been used almost exclusively as a stabilizer particularly in the bleaching of straw and textiles. The neutral pyrophosphate has however already been added also in soap bleaching powders, for instance in American soap powders, which contain an addition of up to 8% of neutral sodium pyrophosphate.

Neutral sodium pyrophosphate has only been used as stabilizer, because it was found that neither ordinary sodium phosphate nor water glass exert any stabilizing action.

In order to be able to make a comparison between the various stabilizers, in each case 2 gs. perborate were dissolved in 150 ccms. distilled water and the quantity of the said salts equivalent to 2 gs. of anhydrous di-sodium phosphate were added. This bleaching solution was heated in an Erlenmeyer flask in a thermostat to 80° C. and maintained at this temperature during the whole of the experiment. The active oxygen then still contained in the bleaching solution was determined in a known manner with a 1/20 normal/permanganate solution. The following figures show the results of these experiments and give the percentage content of active oxygen still present:

|  | After 1ʰ | 2ʰ |
|---|---|---|
| 150 ccms. perborate solution + 2 gs. $Na_2HPO_4$ | 2,7% | 0,9% |
| 150 ccms. perborate solution + 1 g. water glass | 1,2% | 0,4% |

It is obvious from this that in reality neither di-sodium phosphate nor water glass are to be recommended as stabilizers in peroxide bleaching liquors. The same inactivity was also found in the case of soap solutions which contained perborate. In contradistinction to these two substances, neutral sodium pyrophosphate has a considerably better stabilizing action. This is clear from the following experiments, the figures again giving the percentage content of action oxygen still present:

|  | After 1ʰ | 2ʰ | 3ʰ | 4ʰ |
|---|---|---|---|---|
| 150 ccms. perborate solution + 2 gs. $Na_4P_2O_7$ | 36,5 | 19,0 | 10,0 | 6,8% |
| 150 ccms. perborate solution + 1 g. $Na_4P_2O_7$ | 17,0 | 8,5 | 4,1 | 3,8% |
| 150 ccms. perborate solution + 0,4 gs. $Na_4P_2O_7$ | 9,3 | 3,4 | 2,4 | 1,4% |
| 150 ccms. perborate solution without stabilizer | 0,0 | — | — | —% |

The same results were obtained with bleaching soap solutions. For this purpose 5 gs. of a soap powder, consisting of 87,5% soap and 12,5% perborate, were dissolved in 300 ccms. distilled water and heated at 80° C. for several hours. The active oxygen still present was found to be:

|  | After 1ʰ | 2ʰ | 3ʰ |
|---|---|---|---|
| In 5 gs. soap powder + 300 ccms. $H_2O$ | 10,0 | 0,0 | —% |
| In 5 gs. soap powder + 300 ccms. $H_2O$ + 0,4 gs. $Na_4P_2O_7$ | 50,0 | 30,0 | 20,0% |

If these results are critically compared with neutral pyrophosphate, it is clear that the latter may be considered as a fairly good stabilizer. Nevertheless both in the pure perborate liquor as well as in soap liquor containing perborate, 64 to 50% of the active oxygen is still lost by spontaneous decomposition. Experiments made with pure perborate solution also show that the same quantities of perborate and neutral pyrophosphate have to be employed, to obtain a result which can be of some practical use.

Careful scientific investigation has led to the new and surprising discovery that the stabilizing of solutions containing active oxygen not only depends upon the presence of a chemical substance acting as a stabilizer, but to an equal extent upon the physico-chemical conditions of the bleaching liquor. These conditions are determined by the concentration of the hydrogen ions in the bleaching liquor and it has been found that there is a preferable range of concentration from $p_h=7$ to 10 (according to the purpose of use) at which the stabilizing action of a salt known as a stabilizer is at its best. It is of such fundamental importance to maintain this especially effective hydrogen ion concentration that even with the best stabilizer, this stabilizing action can be depreciated to a considerable degree if the hydrogen ion concentration is not correctly adjusted. In the case of ordinary bleaching liquors free from soap, it has been found that only the very restricted range of $p_h=7$ to $p_h=8,5$ in the bleaching liquor is an optimum for the stabilizing action, whereas in bleaching liquors containing soap the range of the best hydrogen ion concentration is somewhat larger and goes as far as $p_h=10$.

The adjustment of the bleaching solution to this hydrogen ion concentration is effected in the case of bleaching solutions free from soap and when neutral pyrophospate is used as stabilizer, by means of inorganic or organic acids or acid salts, and in the case of bleaching solutions containing soap, by means of acid salts. Of these, bisulphate or acid phosphates of the formula $MH_2PO_4$ (where M is sodium or ammonium) are particularly suitable. Acid pyrophosphate has however proved to be the best.

For example in a perborate solution, which contained neutral pyrophosphate as stabilizer, and in which a hydrogen ion concentration of $p_h=9,5$ was determined, after 1, 2, 3 and 4 hours respectively, there was still 36,5%, 19%, 10% and 6,8% active oxygen still undecomposed. However when the hydrogen ion concentration was adjusted to $p_h=8,2$ by the addition of acid pyrophosphate, after 1, 2, 3 and 4 hours there was still present 97,5%, 95,2%, 93,5% and 92,0% respectively of undecomposed oxygen.

Upon following up this discovery of the importance of a particular hydrogen ion concentration in the bleaching liquors it was found that the most favourable hydrogen ion concentration for obtaining a very satisfactory stabilization occurs automatically only by the exclusive use of an acid alkali pyrophosphate as stabilizer, which has consequently proved to be an absolutely ideal stabilizer. It is entirely new to use this salt as stabilizer, because although the German Patent 226,090 clearly refers to alkali pyrophosphates, yet according to the state of the art at that time with respect to pyrophosphates, neutral pyrophosphate was the only one sold commercially and also this only was used by the inventor for his experiments.

The particularly characteristic and valuable properties of acid pyrophosphate as stabilizer were therefore unknown to him and in reality all bleaching works and manufactures of soap bleaching agents even today only use neutral sodium pyrophosphate as stabilizer.

The surprising novelty and extraordinary technique effect in the action of the acid pyrophosphate consists in the case of a hydrogen ion concentration of $p_h=8,0$ to 8,6 occurring automatically, in almost completely counteracting the dissociation of the oxygen salts and in the very small amount of substance required for obtaining this effect. This should be shown by the following results of experiments:

These experiments were again carried out at 80° C. The figures give the percentage content of active oxygen still present:

| | After $1^h$ | $2^h$ | $3^h$ | $4^h$ |
|---|---|---|---|---|
| 150 ccms. perborate solution + 2 gs. $Na_2H_2P_2O_7$ | 97,5 | 95,2 | 93,5 | 92,0% |
| 150 ccms. perborate solution + 1 g. $Na_2H_2P_2O_7$ | 93,2 | 86,4 | 80,0 | 75,5% |
| 150 ccms. perborate solution + 0,4 gs. $Na_2H_2P_2O_7$ | 62,2 | 38,4 | 24,7 | 18,1% |

These results show the great technical advantage of the acid pyrophosphate as compared with the neutral salt. After 4 hours with the same amounts of perborate and acid pyrophosphate only 8% is decomposed and even when the fifth of this quantity is added the stabilizing action is about 65% greater than the best effect obtained when neutral pyrophosphate is used.

In order to bring the hydrogen ion concentration of a bleaching bath to 7 to 8, to 2 grammes perborate dissolved in 150 ccm. water, 1 to 2 grammes acid pyrophosphate are required. In order to bring the hydrogen ion concentration of a soap-containing bleaching bath up to 8 to 10, to 10 grammes of the soap powder 1 gramme of acid pyrophosphate is necessary.

Exactly the same phenomena and results can be obtained in the case of soap bleaching liquors or in the case of washing powders, which in addition to soap also contain perborate and in some cases also soda.

For instance the following amounts of undecomposed oxygen were found still present in a soap bleaching powder solution:

| | After $1^h$ | $2^h$ | $3^h$ | $4^h$ |
|---|---|---|---|---|
| When $p_h=11$ | 19,5 | 8,9 | 6,0 | — % |
| When $p_h=8,6$ | 79,5 | 67,6 | 59,2 | 44,5% |

The hydrogen ion concentration of $pH=11$ occurs when ordinary soap bleaching powder containing soda is used with neutral pyrophosphate as stabilizer, whereas the most favorable above shown hydrogen ion concentration is obtained by using acid pyrophosphate as stabilizer.

The effect of a content of lime in the washing water is evident from the following experiments:

10 gs. soap bleaching powder were dissolved in 300 ccms. distilled water and the solution maintained 1 to 4 hours at 80° C. The active oxygen still present was then determined at intervals and the following figures gives the percentage thereof:

|  | After 1ʰ | 2ʰ | 4ʰ |
|---|---|---|---|
| 10 gs. soap powder + 0,8 gs. Na₂H₂P₂O₇ | 91,0 | 75,6 | 63,4% |
| 10 gs. soap powder without stabilizer | 10,0 | 0,0 | —% |

If an ordinary hard tap water containing 123 mgs. CaO dissolved per litre is used instead of distilled water the results are as follows:

|  | After 1ʰ | 2ʰ | 4ʰ |
|---|---|---|---|
| 10 gs. soap bleaching powder 0,8 gs. Na₂H₂P₂O₇ | 82,0 | 69,0 | 53% |
| 10 gs. soap bleaching powder without stabilizer | 0,0 | — | —% |

With soap bleaching powders containing soda the oxygen is just as completely used up. In the experiments use was made of two soap bleaching powders as primary material, the composition of which was only different with respect to the content of soda.

No. 1 contained 70,7% soap, 13,0% soda, 8,6% perborate.

No. 2 contained 81,0% soap, 3,5% soda, 8,6% perborate.

The experiments were made with water of 12,3 degrees hardness according to German standards (123 mg. CaO per litre). The composition of soap powder No. 1 was that of the usual soap powder on the market. In soap powder No. 2 the content of soda was calculated on a hardness of the water of 24 degrees (German standards), a hardness which would only occur in the most rare cases. A definite quantity of the stabilizer was added in each case to the soap powders, and 10 gs. of the mixture in each case were dissolved in 750 ccms. water and kept in thermostats several hours at a temperature of 80° C. The following figures again give the percentage of the active oxygen still present:

| Soap powder No. 1 | After 1ʰ | 2ʰ | 3ʰ | 4ʰ |
|---|---|---|---|---|
| 10 gs. soap powder + 0,9 gs. Na₂H₂P₂O₇ | 41,0 | 19,0 | 15,0 | 2% |
| 10 gs. soap powder + 0,77 gs. Na₄P₂O₇ | 19,5 | 8,9 | 6,0 | —% |
| 10 gs. soap powder without stabilizer | 9,4 | 5,6 | 0,0 | —% |

| Soap powder No. 2 | After 1ʰ | 2ʰ | 3ʰ | 4ʰ |
|---|---|---|---|---|
| 10 gs. soap powder + 0,86 gs. Na₂H₂P₂O₇ | 93,6 | 84,5 | 64,5 | 48,0% |
| 10 gs. soap powder + 0,65 gs. Na₂H₂P₂O₇ | 79,5 | 67,6 | 59,2 | 44,5% |
| 10 gs. soap powder + 0,77 gs. Na₄P₂O₇ | 19,5 | 8,9 | 6,0 | 0% |

These experiments show the great superiority of the acid pyrophosphate as stabilizer also with soap bleaching solutions containing soda. It is very clear that the spontaneous dissociation of the oxygen salt is retarded to an extent hitherto considered impossible and that the oxygen in the bleaching agent can thereby be used up to an extent greater by more than 100% than hitherto. The economical advantage and utility are consequently obvious.

In the appended claims by the term a peroxide bleaching agent, I mean to include peroxides and persalts, the former yielding hydrogen peroxide on treatment with acids and the latter yielding hydrogen peroxide on decomposition.

What I claim is:—

1. In the art of stabilizing bleaching liquors containing a peroxide bleaching agent, together with an alkali pyrophosphate as a stabilizer, the step which comprises adding an acid salt to the liquor in quantity sufficient to maintain the hydrogen ion concentration of the liquor between the limits $p_h$ 7 — $p_h$ 10, said acid salt being an acid phosphate.

2. In the art of stabilizing bleaching liquors containing a peroxide bleaching agent, the step which comprises adding an alkali acid pyrophosphate to the bleach liquor to stabilize the bleaching agent and in quantity sufficient to keep the hydrogen ion concentration of the bleach liquor within the limits $p_h$ 7 — $p_h$ 70.

In testimony whereof I have affixed my signature.

FRITZ DRAISBACH.